United States Patent
Gerspach et al.

(10) Patent No.: US 11,262,733 B2
(45) Date of Patent: Mar. 1, 2022

(54) METHOD, DEVICE, AND COMPUTER PROGRAM FOR CONFIGURING AN INTELLIGENT ELECTRONIC DEVICE

(71) Applicant: Hitachi Energy Switzerland AG, Baden (CH)

(72) Inventors: Stephan Gerspach, Herrischried (DE); Wolfgang Wimmer, Langenthal (CH)

(73) Assignee: HITACHI ENERGY SWITZERLAND AG, Baden (CH)

(*) Notice: Subject to any disclaimer, the term of this patent is extended or adjusted under 35 U.S.C. 154(b) by 113 days.

(21) Appl. No.: 16/178,925

(22) Filed: Nov. 2, 2018

(65) Prior Publication Data

US 2019/0129392 A1    May 2, 2019

(30) Foreign Application Priority Data

Nov. 2, 2017    (EP) .................................. 17199787

(51) Int. Cl.
*G05B 19/418*    (2006.01)
*H02J 13/00*    (2006.01)

(52) U.S. Cl.
CPC .... *G05B 19/41845* (2013.01); *H02J 13/0006* (2013.01); *G05B 2219/31101* (2013.01); *G05B 2219/31368* (2013.01)

(58) Field of Classification Search
CPC .... G05B 19/41845; G05B 2219/31101; G05B 2219/31368; H02J 13/0006
See application file for complete search history.

(56) References Cited

U.S. PATENT DOCUMENTS

| 6,882,888 | B2 | 4/2005 | Wimmer et al. |
| 8,532,944 | B2* | 9/2013 | Vetter ................ H02J 13/0006 700/292 |
| 2008/0127210 | A1 | 5/2008 | Bosold et al. |
| 2009/0070051 | A1* | 3/2009 | Vetter ................ H02J 13/0006 702/57 |

(Continued)

FOREIGN PATENT DOCUMENTS

| CN | 104412543 A | 3/2015 |
| CN | 106528961 A | 3/2017 |

(Continued)

OTHER PUBLICATIONS

R. P. Gupta, Substation Automation Using IEC-61850,, 2004, national Power Conference, NPSC, pp. 301-304,. (Year: 2004).*

(Continued)

*Primary Examiner* — Kidest Bahta
(74) *Attorney, Agent, or Firm* — Slater Matsil, LLP

(57) ABSTRACT

A method and device for configuring an intelligent electronic device, IED, hosting a logical node instance are provided. Incoming signals of the IED are bound to inputs of a function, the function being performed by the logical node instance in operation of an industrial automation control system, IACS. To bind the incoming signals to the inputs of the function, a computing device determines, based on an input data template of the logical node instance, which data is required by the logical node instance to perform the function. The computing device determines, using process related information of the IACS, source IEDs of the IACS that provide the data required by the logical node instance to perform the function.

20 Claims, 4 Drawing Sheets

(56) References Cited

U.S. PATENT DOCUMENTS

| | | | |
|---|---|---|---|
| 2012/0029850 A1* | 2/2012 | Kagan | H04L 67/125 |
| | | | 702/62 |
| 2012/0191959 A1* | 7/2012 | Kumar | H04L 67/125 |
| | | | 713/1 |
| 2014/0344559 A1 | 11/2014 | Morita et al. | |
| 2015/0172124 A1 | 6/2015 | Piccinini et al. | |
| 2015/0347096 A1* | 12/2015 | Hanna | G06F 8/36 |
| | | | 717/107 |
| 2017/0063085 A1 | 3/2017 | Onteddu et al. | |
| 2017/0075320 A1* | 3/2017 | Day | H02J 13/00016 |
| 2020/0014208 A1* | 1/2020 | Bickel | H02H 7/261 |

FOREIGN PATENT DOCUMENTS

| | | |
|---|---|---|
| CN | 107231257 A | 10/2017 |
| EP | 1191662 A1 | 3/2002 |
| WO | 2014075818 A1 | 5/2014 |
| WO | 2014175884 A1 | 10/2014 |

OTHER PUBLICATIONS

Roostaee et al., Substation Automation System Using IEC 61850, Jun. 2011, The 5th International Power Engineering and Optimization Conference (PEOCO2011), p. 393-397. (Year: 2011).*

European Patent Office, Extended Search Report issued in corresponding Application No. 17199787.7, dated Apr. 5, 2018, 9 pp.

* cited by examiner

METHOD, DEVICE, AND COMPUTER PROGRAM FOR CONFIGURING AN INTELLIGENT ELECTRONIC DEVICE

FIELD OF THE INVENTION

The invention relates to methods and devices for configuring an intelligent electronic device of an industrial automation control system. The invention relates in particular to methods and devices that provide assistance to an engineer when configuring the intelligent electronic device.

BACKGROUND OF THE INVENTION

Industrial automation control systems (IACSs) are widely used. Substation automation (SA) systems are exemplary for an IACS. The IACS comprises primary devices. For a substation, the primary devices may be electrical cables, lines, bus bars, switches, power transformers and instrument transformers, which may be arranged in switch yards and/or bays. The primary devices are operated in an automated way via a SA system. The SA system, or more generally the IACS, comprises secondary devices, which may include Intelligent Electronic Devices (IED), responsible for the protection, control and monitoring of the primary devices.

IEDs may perform functions on a process, like a substation switch yard. Typical functions beyond automation of certain tasks are monitoring, supervision, control and protection of the process and of the humans working close to the process.

A function may be distributed between several IEDs exchanging data. With the introduction of a process bus, a further degree of distribution is reached, because the function as such can also be physically separated from the data acquisition and process control interface.

The data flow between the parts of a function running on different IEDs needs to be engineered, which is time consuming and therefore costly. Errors in this process can lead to significant adverse consequences with regard to, e.g., system safety and availability. The engineering of the data flow is part of a process of configuring an IED before it starts operation. A process of configuring IEDs may be required during commissioning of an IACS or when an IED of an IACS is replaced or modified. As used herein, the term "configuring an IED prior to operation of the IED" also includes scenarios in which an IED must be re-configured, which may be the case when other IEDs in the IACS are exchanged or new IEDs are added to the IACS, for example.

In view of the complexity associated with configuring IEDs, methods and devices that assist an engineer in these tasks are useful, both to reduce the complexity with which the engineer is faced and to enhance system safety and availability.

EP 1 191 662 A2 discloses a method of configuring a SA system. The method disclosed in EP 1 191 662 A2 can be used to assist an engineer in generating, at a sender side, information on data that will be sent by various service types to other IEDs or logical node instances. While such techniques greatly assist an engineer in setting up data flows between IEDs of an IACS, they still require the engineer to manually bind incoming signals at an IED to inputs of a function performed by a logical node instance hosted by the IED. This binding is also referred to as "internal binding," "because it involves the mapping between the incoming signals received at the IED and the inputs of a function performed by a logical node instance hosted by the IED. Traditionally, this binding still requires human expert knowledge, is error prone, and time consuming, even when the configuration is performed by a very experienced engineer.

When the specific internal implementation of a logical function by an IED is known, proprietary software solutions may be implemented that provide further assistance to the engineer for configuring the IED. As different manufacturers of IEDs use different implementations for logical functions, which are not readily accessible, it would be desirable to provide methods and devices that assist the engineer in the process of configuring an IED without requiring knowledge on the specific, proprietary implementation of a logical function by the IED.

SUMMARY

It is an object of the invention to provide improved methods and devices for configuring an intelligent electronic device (IED). It is an object of the invention to provide improved methods and devices for configuring an IED, which mitigate the risk of errors occurring during a manual configuration. It is an object of the invention to provide improved methods and devices for configuring an IED which automatically bind incoming data of the IED to inputs of a function performed by a logical node instance hosted by the IED. It is an object of the invention to provide methods and devices that can assist an engineer without requiring knowledge on the IED-proprietary implementation of the function.

A method, a device, and a computer program as recited in the independent claims are provided. The dependent claims define embodiments.

According to embodiments, methods and devices are provided which assist an engineer in configuring an IED by providing a partial or complete automation of binding incoming signals of the IED to inputs of a function, with the function being performed by a logical node instance hosted by the IED during operation of the IED. To this end, a computing device is provided that automatically determines source IEDs that provide data required by the logical node instance to perform the function.

The computing device may use an input data template of the logical node instance to determine which data is required by the logical node instance to perform the function. The input data template may be a template input section for late binding in conformity with IEC 61850 ed. 2.1. Determining the data required by the logical node instance to perform the function may comprise determining the data items of the input data template which have not yet been bound to a source IED. As used herein the term "data required to perform the function" relates to the kind of data items required during subsequent operation of the IED in an industrial automation control system (IACS), but does not require knowledge of specific values of these data items during subsequent use. Data items selected from a group consisting of a switch position, a current, a voltage, timing related parameter, or other parameters are exemplary for the "data required to perform the function", which may be indicated in the template input section for late binding in conformity with IEC 61850 ed. 2.1.

According to embodiments, the computing device may use the input data template and process related information of the IACS to perform the automatic binding of input signals to inputs of the function performed by the logical node instance. The process related information may be included in a configuration description of the IACS. The configuration description may be a standardized configuration description, e.g., a substation configuration description (SCD) file, or a proprietary configuration description of the IACS. The process information that is used by the computing device may include topology information of the IACS. The process information may be a process section of an SCD file.

According to embodiments, the computing device may use the input data template (e.g., the template input section of a SCD file in conformity with IEC 61850 ed. 2.1), the process related information (e.g., the process section of an SCD file), and application knowledge to automatically bind the input signals of the IED to the inputs of the function performed by the logical node instance. The application knowledge may provide the information on which logical node classes have to exchange information with each other for performing the function. For illustration, for a control function, data may have to be exchanged between an instance of logical node class XCBR and in instance of logical node class CSWI according to IEC 61850, that are respectively associated with the same circuit breaker, but which may be hosted on different IEDs.

According to an embodiment, a method of configuring an IED hosting a logical node instance is provided. The method comprises binding incoming signals of the IED to inputs of a function, the function being performed by the logical node instance in operation of an IACS. Binding the incoming signals to the inputs of the function comprises the following steps performed by a computing device prior to operation of the IED: determining, based on an input data template of the logical node instance, which data is required by the logical node instance to perform the function; and determining, using process related information of the IACS, source IEDs of the IACS that provide the data required by the logical node instance to perform the function.

The process related information may be included in a process section which contains topology information and is part of a substation configuration language, SCL, file. The SCL file may be a SCL file in accordance with IEC 61850.

The step of determining which source IEDs provide the data may comprise analyzing the topology information to identify primary devices with which the source IEDs that provide the data required by the function are associated.

The process related information may define relations between logical node instances hosted by the source IEDs and primary devices. The process related information may define relations between the logical node instance hosted by the IED and a primary device.

Binding incoming signals of the IED to inputs of the function may further comprise a step of complementing, by the computing device, configuration data of the IED. Complementing the configuration data may comprise adding information to a predefined input section of a configuration description according to IEC 61850 ed. 2.1.

Prior to performing the binding, an input section of the logical node instance inside a substation configuration description of the IED may be a template input section for late binding (e.g., in accordance with IEC 61850 ed. 2.1). The step of determining the data required by the logical node instance to perform the function may comprise determining the data required by the logical node instance based on the template input section. The step of complementing the configuration data comprises adding information on the source IEDs to the template input section.

The computing device may automatically complement the configuration data when the source IEDs and/or incoming signals are unambiguously identified.

The method may further comprise outputting information on plural candidate source IEDs via a user interface in response to determining that at least one source IED cannot be unambiguously identified by the computing device.

The method may further comprise automatically creating, by the computing device, data sets for communication between the IED and the source IEDs.

Binding the incoming signals of the IED to the inputs of the function may be successively performed for the function performed by the logical node instance hosted by the IED and at least one further function performed by the logical node instance hosted by the IED or performed by another logical node instance.

The function may be selected from a group consisting of a control function, a synchrocheck function, a breaker failure function, a differential protection function, a distance protection function, and an interlocking function.

The IACS may be a substation automation (SA) system.

According to another embodiment, a device for configuring an IED hosting a logical node instance is provided. The device is adapted to bind incoming signals of the IED to inputs of a function performed by the logical node instance in operation of an IACS. The device comprises at least one processor adapted to: determine, based on an input data template of the logical node instance, which data is required by the logical node instance to perform the function; and determine, using process related information of the industrial IACS, which source IEDs of the industrial automation control system provide the data required by the logical node instance to perform the function.

The device may be adapted to perform the method according to any embodiment disclosed herein.

According to another embodiment, there is provided computer-executable instruction code which, when executed by a processor, causes the processor to perform the method according to any embodiment disclosed herein.

In the method, computing device, and computer-executable instruction code according to embodiments of the invention, binding an input signal to an input of the function performed by the logical node instance may comprise specifying which name the incoming signal used as an input to the function has at the source IED. Binding may comprise specifying which source IED provides the incoming signal used as an input to the function. This information, i.e., an identifier for the source IED (which may be an identifier for a logical node instance hosted by the source IED) and/or the name of the input signal at the source IED, may be written into the input section of the IED that is configured using the computing device.

The method, computing device, and computer-executable instruction code according to embodiments of the invention allow the process of binding incoming signals of an IED to inputs of a function performed by a logical node instance hosted by the IED to be performed in a partially or fully automated manner. A computing device may automatically identify one or several candidate source IEDs that may provide the data required by the logical node instance to perform the function, based on an input data template (which may be, e.g., a template input section according to IEC 61850 ed. 2.1) and process related information (which may be, e.g., a process section of an SCL file). The time and complexity required for configuring the IED is reduced with the aid of the methods and computing devices according to embodiments. The risk of misconfigurations is reduced, making the methods and devices particularly suitable for security-aware customers.

Embodiments of the invention may be used for configuring IEDs of a substation automation (SA) system, e.g., in a transformer station or other power utility, without being limited thereto.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF EMBODIMENTS

Exemplary embodiments of the invention will be described with reference to the drawings in which identical or similar reference signs designate identical or similar elements. While some embodiments will be described in the context of a substation automation (SA) system, the methods and devices described in detail below may be used in a wide variety of industrial automation control systems (IACSs). The features of embodiments may be combined with each other, unless specifically noted otherwise.

Figure 1:
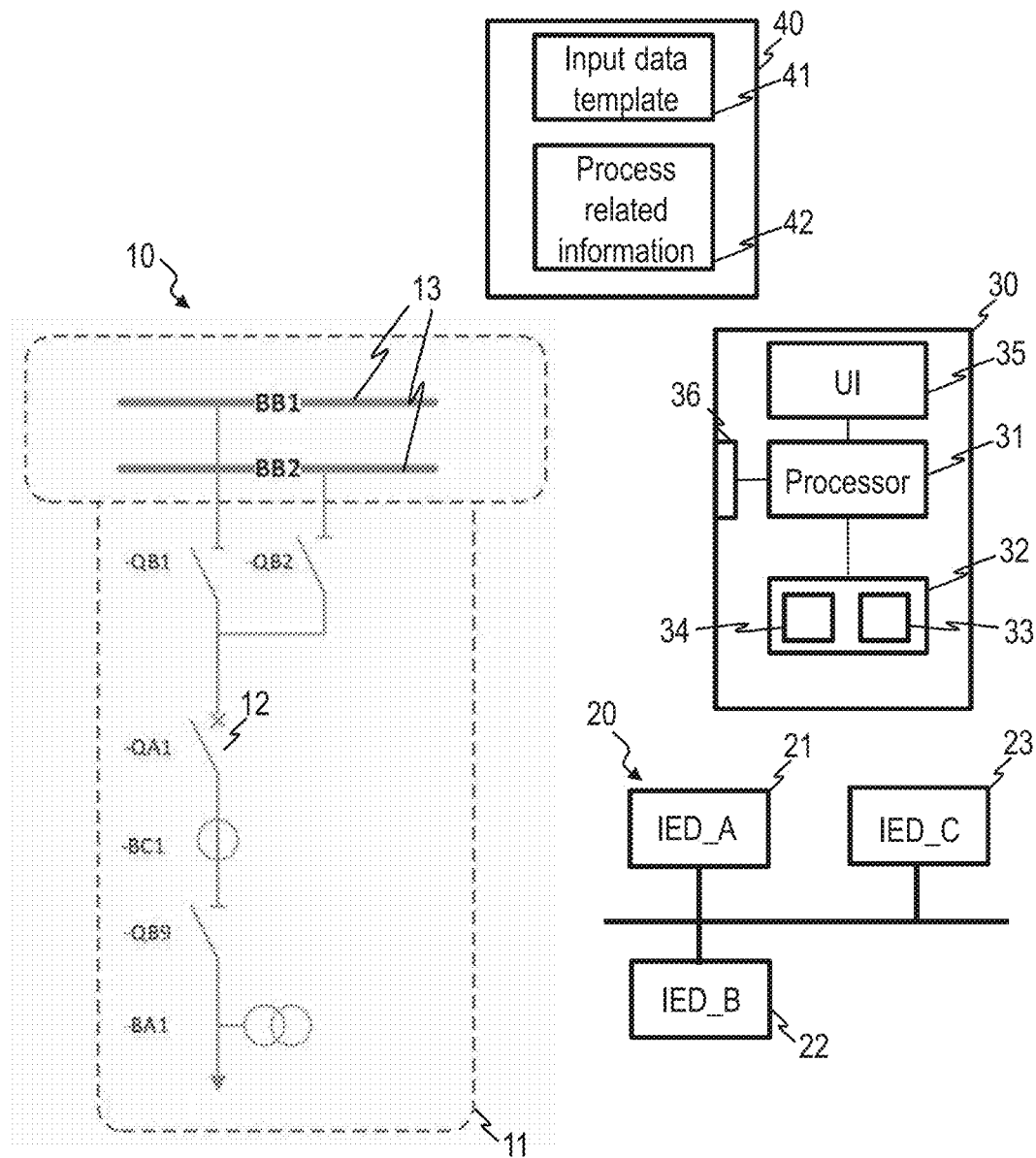
FIG. 1 is a schematic representation of an industrial automation control systems (IACS) and a computing device for configuring the IACS according to an embodiment.

FIG. 1 is a schematic representation of a system which comprises an industrial utility and an IACS 20. The industrial utility may be a power utility 10, such as a transformer substation or other power utility system. The power utility 10 may include a switch bay 11 and primary devices such as a circuit breaker 12 and bus bars 13.

The IACS 20 may be a SA system. The IACS 20 comprises plural intelligent electronic devices (IEDs) 21-23. The IACS 20 may respectively comprise additional networked devices, such as a merging unit (MU), a sensor, or other networked devices. The IEDs 21-23 may communicate with each other over a communication network.

Logical node instances may be hosted by the plurality of IEDs 21-23. In operation of the IACS 20, the logical node instances hosted by the IEDs 21-23 may perform functions selected from a group consisting of a control function, a synchrocheck function, a breaker failure function, a differential protection function, a distance protection function, and an interlocking function, without being limited thereto. A function performed by a logical node instance hosted by an IED 21 has a set of inputs. The inputs may be selected from a group consisting of a state of a switch, states of several switches, one or several current values, one or several voltage values, timing related values, or other data relating to the operation of the power utility 10. The inputs may be inputs required for performing a control function, a synchrocheck function, a breaker failure function, a differential protection function, a distance protection function, or an interlocking function.

For configuring an IED 21, incoming signals that will be received by the IED 21 during operation of the IACS 20 must be bound to inputs of a function performed by a logical node instance hosted by the IED 21. Binding refers to mapping incoming signals that will be received by the IED 21 during operation of the IACS 20 to an input of the function performed by the logical host instance hosted by the receiving IED 21. Each incoming signal that will be received by the IED 21 during operation of the IACS 20 may respectively be defined by information relating to the source IED 22, 23 generating the respective signal for transmission to the receiving IED 21 and/or a name of the respective signal at the source IED 22, 23.

Conventionally, the binding is still performed by a human expert, e.g., an engineer having expert knowledge of the operation of the power utility 10 and IACS 20 as well as the functions performed by the logical node instance. The binding is a complex and time consuming task.

In order to assist the engineer in this complex task, the present invention provides methods and devices that allow the binding to be performed fully automatically or at least partially automatically. The methods and devices according to embodiments may be operative to perform the binding of incoming signals to inputs of the function without requiring information on the specific, possibly proprietary implementation of the function in the IED 21. Information on which data (e.g., which kind of data selected from the group consisting of a state of a switch, states of several switches, one or several current values, one or several voltage values, or other data relating to the operation of the power utility 10) is required as input for the function may be retrieved from input data template of the IED 21. The input data template may be a template input section of a configuration description in accordance with IEC 61850 ed. 2.1. However, no information on how the function is implemented in the IED 21 is required by the methods and devices to perform the binding. Thus, the automatic binding may be performed even if the specific, possibly proprietary implementation of the function in the IED 21 is not known, provided that the input data required for performing the function may be determined from, e.g., the input data template of the IED 21, and the general process-related features of the function.

A device 30 can be communicatively coupled to the IACS 20 for configuring an IED 21 or plural IEDs 21-23. The device 30 may be used during commissioning of the IACS 20, for example, or when one of the IEDs 21-23 and/or communication links between the IEDs 21-23 have been exchanged, upgraded, or otherwise modified.

The device 30 comprises at least one processor 31 and a storage device 32. Software applications 33, 34 may be stored in storage device 32. A software application 33 causes the processor 31 to perform automatic binding of input signals of an IED 21 to inputs of a function that will be performed by a logical node instance hosted on the IED 21. Another software application 34 may optionally cause the processor 31 to perform automatic binding of input signals of an IED 21 to inputs of a further function that will be performed by a logical node instance hosted on the IED 21. The software applications 33, 34 may be implemented as computer program modules called up by one executable file, for example. The software application(s) 33, 34 may be operative to perform automatic binding for only one function, two functions, or more than two functions that may respectively be selected from the group consisting of a control function, a synchrocheck function, a breaker failure function, a differential protection function, a distance protection function, and an interlocking function, without being limited thereto. As will be explained in more detail below, the software application(s) 33, 34 may respectively cause the processor 31 to identify data required by the function performed by the logical node instance hosted by the IED 21 from an input data template of the IED 21. The input data template 41 may be stored in a configuration description, such as a substation configuration description (SCD) file. The input data template may be the template input section (also referred to as "predefined input section") in conformance with IEC 61850 ed. 2.1. The software application(s) 33, 34 may respectively cause the processor 31 to determine, using process related information of the IACS 20, which source IEDs 21-23 provide the respective data items. The process related information may be stored in the configuration description of the IACS 20, such as a SCD file 40. The process related information may be a process section 42 in conformance with IEC 61850 ed. 2.1. The software application(s) 33, 34 may perform the binding automatically by complementing information in the input section of the logical node instance hosted by the IED 21. For illustration, an identifier for the source IED or a logical node instance hosted by the source IED and an identifier (e.g., name) of the respective signal at the source IED may be written into the input section of the configuration data of the IED 21 by the device 30. Alternatively or additionally, the device 30 may output one or several candidate source IEDs 21-23 or candidate signals via a user interface (UI) 35, allowing the engineer to select the correct source IED or correct incoming signal from among a list of candidates identified automatically by the device 30. The device 30 may then perform the binding by complementing information in the input section of the logical node instance hosted by the IED 21, using the selection from among the list of candidates received via the UI 35.

The device 30 may also use application knowledge to perform the binding. The application knowledge may be encoded in the respective software application(s) 33, 34. The application knowledge that is used to perform the binding depends on the respective function for which binding is performed. For illustration, a control function performed by logical node instance of logical node class CSWI in conformity with IEC 61850 requires the state of a switch as input. The state of the switch is provided by a logical node instance of logical node class XCBR. The application knowledge encoded in the software application 33 that performs binding for the control function takes into account that the state of the switch must be provided by the logical node instance of logical node class XCBR associated with the same breaker as the logical node instance of logical node class CSWI. Other rules reflecting the application knowledge are applicable for other functions. For illustration, to perform the binding for a synchrocheck function, the application knowledge encoded in the software application 34 that performs binding for the synchrocheck function takes into account that voltages measured on opposite sides of a switch are inputs to the synchrocheck function.

The device 30 may be a system tool. The device 30 may be a general purpose computer, tablet, or other mobile computing device that can be communicatively coupled to the IEDs 21-23 via a communication interface 36. The device 30 may perform functions in addition to automatic binding, such as configuring data flows between IEDs and configuring GOOSE blocks in IEDs.

As will be explained in more detail below, methods and devices according to embodiments automate IED input binding and data flow generation without requiring knowledge about an IED internal function implementation. The methods and devices use information about the function in general, i.e., information of the function as related to the process, but do not require information on the algorithmic implementation of the function in the IED.

Methods and devices according to embodiments may use information from the process section 42 included in a SCD file 40 or another formal configuration description with an input data template 41 of a logical node instance hosted by the IED 21 to perform the automatic binding. The SCD file 40 may be stored in a storage medium and may be access by the device 30 via the communication interface 36 and/or may be downloaded onto the device 30. The process section 42 serves to describe the functional structure of a primary process like a power plant, a substation, or another power utility or industrial utility. The process section 42 may identify the primary devices such as switches and their electrical connections inside substations, power networks, or another power utility or industrial utility. By means of logical nodes attached to the primary process elements, the system functionality and the system related meaning of the respective logical nodes and their data objects is derived.

The input data template 41, which may be the predefined input section for 'late binding' in conformity with IEC 61850 ed. 2.1, provides information on the expected input types and semantic in a standardized or other formal manner. The input data template 41 may be associated with the logical node instance hosted by the IED 21 for which the binding is performed. The input data template 41 restricts IED related flexibility in the configuration process by limiting the allocation of inputs and data types that are supported and transferring the task of IED internal binding to the device 30. This information can be used by the device 30 to perform the automatic binding.

The method and device 30 according to the invention uses the information provided by the process section 42 and the input data template 41. In combination with application knowledge, the IED internal binding of incoming IEC 61850 signals to function inputs is performed:

The device 30 may use the process section 42 to determine which functions are allocated to a primary device.
 The application knowledge may provide information on which logical node classes have to exchange information with each other for performing the function.
 The predefined input section 42 associated with the IED provides the information which kind of data needs to be received at which logical node instance.

By combining this information, the device 30 can determine which kind of signals are needed by the function and which kind of signals from other functions, logical node instances, or IEDs should be bound to these inputs.

From the substation section binding of the logical node instances hosted by the IED 21, the device 30 can identify the source IEDs providing the signals expected by the function as well as the destination IEDs requiring inputs of other logical node instances.

The device 30 may use information on the parts of the power utility (e.g., the parts of the switch yard) with which the IED 21 hosting the logical node instances performing the function is associated, and information on other parts of the power utility and related logical node instances from which incoming signals at the IED 21 are expected to come. Additionally, the device 30 may use the information on which kind of input data is expected at the destination logical node instance that performs the function. This information, in combination with application knowledge encoded in the software application 33, 34, may be used to perform the IED-internal binding by mapping incoming signals to inputs of the function performed by the logical node instance hosted by IED 21.

The device 30 can read out the expected kind of data stated in the input data template 41, identify the source logical nodes using the process section 42, can optionally create the required data sets for the communication, and can bind the incoming signals of the IED 21 directly to the 'late binding' inputs of the destination logical node instances, thereby also automating the IED internal input signal binding. The generation of communication sets may be performed using the techniques disclosed in EP 1 191 662 A2, for example.

Even when the binding between the inputs defined by the input data template 41 and the available candidate incoming signals cannot be fully resolved by the device 30 in an automatic manner (which may be the case when more source signals are available as candidates for a specific data element of the input data template 41), the device 30 can provide a list to the engineer via the user interface 31 to indicate the possible candidate signals that can be used for binding.

Methods that may be automatically performed by the device 30 to assist an engineer in configuring the IED 21 will be explained in more detail below.

Figure 2:
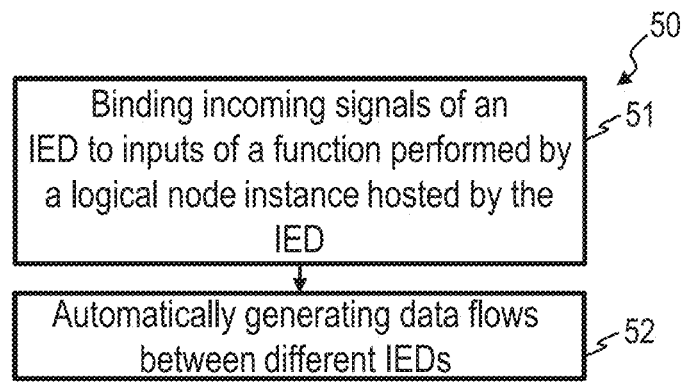
FIG. 2 is a flow chart of a method according to an embodiment.

FIG. 2 is a flow chart of a method 50 according to an embodiment. The method 50 may be performed automatically by the device 30.

At step 51, the device 30 performs automatic binding of incoming signals of an IED 21 to inputs of a function performed by a logical node instance hosted by the IED 21. The automatic binding may use the template input section 41 for the IED 21 stored in an SCD file 40, the process section 42 of the SCD file 40, and application knowledge that may be encoded in a software application 33, 34 that performs the automatic binding. By performing the IED internal binding, signals provided by source IEDs 22, 23 to the destination IED 21 hosting the logical node instance that performs the function are bound to inputs of the function performed by the logical node instance. This may include automatically complementing, by the device 30, the template input section 41 by adding information on the source IEDs (such as identifiers for the source logical node instances) and/or information on the names of the signals at the source IEDs to the template input section.

At step 52, the device 30 may optionally automatically generate the data flows between the IEDs 21-23. The automatic generation of the data flows may be performed using the techniques disclosed in EP 1 191 662 A2, for example. The automatic generation of data flows may comprise configuring appropriate data sets and GOOSE control blocks at the source IEDs 22, 23.

The thus completed SCD file 40 may be transferred to the IEDs for configuring the IEDs.

Figure 3:
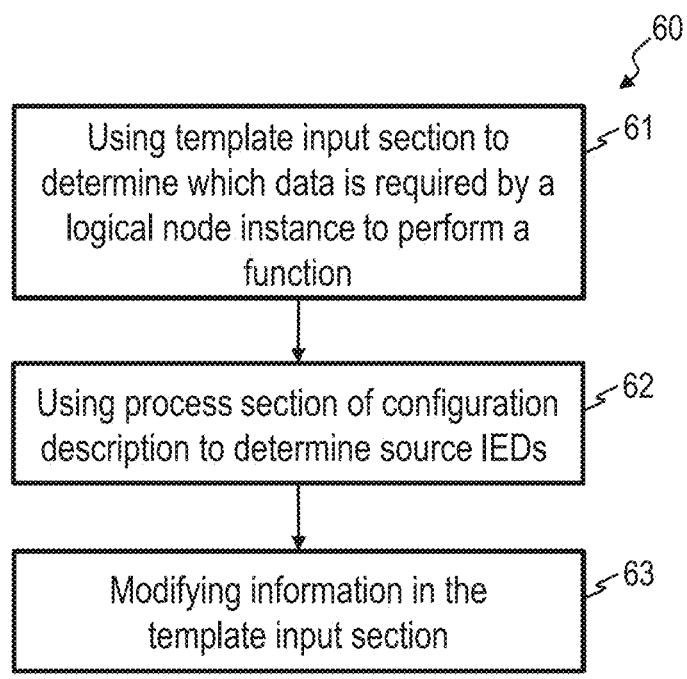
FIG. 3 is a flow chart of a method according to an embodiment.

FIG. 3 is a flow chart of a method 6o according to an embodiment. The method 60 may be performed automatically by the device 30.

At step 61, the device 30 uses the template input section 41 for the IED 21 stored in the SCD file 40 to determine which data (i.e., which type of data, such as switch position, voltage, current, time information) is required by a logical node instance to perform a function. At step 62, the device 30 uses the process section 42 of the SCD file 40 to determine to which primary device the functions are allocated. Using this information and application knowledge encoded in the software application(s) 33, 34, the device 30 may determine the source IEDs 22, 23 and names of signals that are to be bound to the inputs of the function to complete the binding.

At step 63, the template input section 41 for the IED 21 can be complemented. For illustration, names of the signals at the source IEDs that provide the inputs to the function may be written into the ExtRef fields of a template input section 41 that is in conformity with IEC 61850 ed. 2.1.

Figure 4:
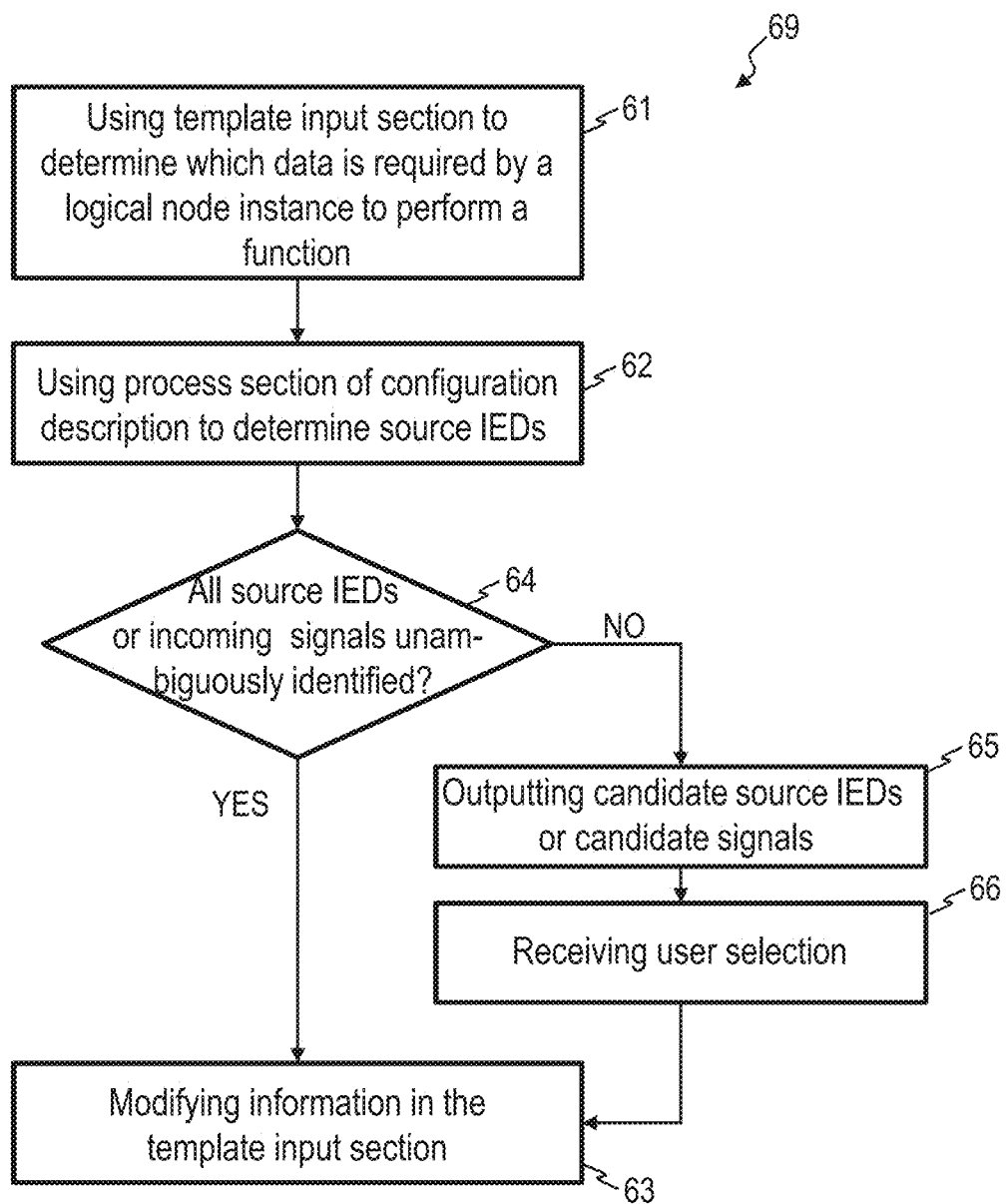
FIG. 4 is a flow chart of a method according to an embodiment.

FIG. 4 is a flow chart of a method 69 according to an embodiment. The method 69 may be performed automatically by the device 30.

Steps 61 and 62 may be performed as described with reference to FIG. 3.

At step 64, the device 30 may verify whether all source IEDs or all incoming signals that are to be bound to the inputs of the function can be unambiguously identified. If all source IEDs or incoming signals that are to be bound to the inputs of the function can be unambiguously identified, the method may proceed to step 63 to complete the binding in a fully automated manner and without requiring a user input for performing the binding.

If not all source IEDs or incoming signals can be unambiguously identified, the method proceeds to step 65. At step 65, information on candidate source IEDs or candidate source signals may be output to a user for selection. At step 66, a user selection is received based on the list of candidates output at step 65. The method completes the binding at step 63, using the user selection for the incoming signals that the device 30 cannot automatically resolve in a fully automated manner. It will be appreciated that, even when human input may be used in step 66, the device 30 still assists the engineer in the configuration process because a list of candidate source IEDs or candidate incoming signals is identified automatically.

The method 69 may optionally automatically generate the data flows between the IEDs 21-23. The automatic generation of the data flows may be performed using the techniques disclosed in EP 1 191 662 A2, for example. The automatic generation of data flows may comprise configuring appropriate data sets and GOOSE control blocks at the source IEDs 22, 23, for example.

In any one of the embodiments discussed above, the input data template 41 may be parsed by the device 30 to determine which data is required by the logical node to perform the function. The process section may be parsed to obtain process related information. Semantic analysis techniques may be used, based on, e.g., the definitions provided in IEC 61850.

It will be appreciated that the source IED does not need to be different from the IED that hosts the logical node instance performing the function. For illustration, the IED 21 may host both a logical node instance of class XCBR and a logical node instance of class CSCWI associated with the same breaker 12. In this case, the IED 21 is the source IED for the switch position provided by the logical node instance XCBR hosted on the IED 21 to the logical node instance CSCWI hosted on the IED 21. The operation of the device 30 when performing a method according to an embodiment will be described in more detail with reference to an exemplary scenario in which binding is performed for a breaker IED at a process bus for the control function as well as for protection trips. Reference will be made to a standardized configuration description in conformity with IEC 61850. It will be appreciated that the techniques may also be used in association with other standardized or proprietary formal descriptions of an IACS 20, provided that the device 30 can retrieve therefrom information on the type of data (e.g., switch position, voltage, current, time information) required by the logical node from the configuration description and information on the underlying process.

In IEC 61850, the interface to a circuit breaker is modeled by means of the logical node XCBR. There are different variants for a final model:

A single XCBR instance as interface to all three phases;
Three XCBR instances, one for each phase; or
Four XCBR instances, one for each phase and one as general three phase interface, also providing a phase discrepancy indication.

The first of these variants (a single XCBR instance as interface to all three phases) will be used herein for further illustration. The other variants would be different mainly in that the phase related XCBR instances will only handle the appropriate phase related input signals, which is indicated by the attribute name (phsA, phsB, phsC instead of general) in the input data template.

It is assumed that the formal description is the SCL variant of IEC 61850 ed. 2.1 (first CDV, 2016).

The control function of a switch inside an IEC 61850 system is implemented by means of a CSWI logical node (LN) handling the commands coming from the operator and checking the interlocking and in case of circuit breaker also the synchrocheck before forwarding commands typically via the GOOSE service to the XSWI LNs (disconnectors and grounding switches) or XCBR LN (circuit breaker). Which instances of CSWI and XSWI/XCBR belong together can be seen by their allocation to the same primary equipment (switch) in a single line.

The logical node instance definition of a CSWI (here instance CSWI1) including its input data template might look as follows:

```
<LN lnType="my_CSWI" lnClass="CSWI" inst="1">
  <Inputs>
  <!-- as many extref at attribute level for later binding as CSWI needs
       expected type is given by the pDO and the pDA; leaves open binding
       to XSWI or XCBR -->
    <ExtRef serviceType="GOOSE" pDO="Pos" pDA="stVal"
  intAddr="Pos/stVal" desc="Position feedback of control interface
  from breaker IED"/>
    <ExtRef serviceType="GOOSE" pDO="Pos" pDA="q"
  intAddr="Pos/stVal" desc="Position feedback of control interface
  from breaker IED"/>
    <ExtRef serviceType="GOOSE" pDO="Pos" pDA="opRcvd"
  intAddr="Pos/opRcvd" desc="Operate received feedback of
  control interface from breaker IED"/>
  </Inputs>
</LN>
```

The expected input of the control function is the state of the switch (Pos.stVal) as a three phase state. The input template leaves the binding to XSWI and XCBR open; this is determined by the binding to the equipment in the Substation section. If the CSWI is specific for a circuit breaker, additionally the ExtRef attribute pLN="XCBR" could be specified. The serviceType attribute specifies the expected communication service for these input signals, in this case GOOSE. The intAddr attribute is the IED internal signal identification for this input. The intAddr attribute or other information in the ExtRef of the template input section may be modified by the device 30 to perform the automatic binding. The contents of all other attributes (except the description 'desc' for humans) is a formal specification of the kind and type of expected input.

The input data template of the logical node instance XCBR is built in a similar manner and could look, e.g., as follows.

```
<LN lnType="my_XCBR" lnClass="XCBR" inst="1">
  <Inputs>
  <!-- as many extref at attribute level for later binding as XCBR needs
       expected type is given by the pDO and the pDA; expected LN class in pLN -->
    <ExtRef serviceType="GOOSE" pLN="PTRC" pDO="Tr" pDA="general"
            intAddr="111111" desc="trip from trip matrix"/>
    <ExtRef serviceType="GOOSE" pLN="PTRC" pDO="Tr" pDA="q" intAddr="111111"
            desc="trip from trip matrix - quality"/>
    <ExtRef serviceType="GOOSE" pLN="PTRC" pDO="Tr" pDA="general"
            intAddr="111112" desc="trip from trip matrix"/>
    <ExtRef serviceType="GOOSE" pLN="PTRC" pDO="Tr" pDA="q" intAddr="111122"
            desc="trip from trip matrix - quality"/>
    <ExtRef serviceType="GOOSE" pLN="PTRC" pDO="Tr" pDA="general"
            intAddr="111113" desc="trip from trip matrix"/>
    <ExtRef serviceType="GOOSE" pLN="PTRC" pDO="Tr" pDA="q" intAddr="111113"
            desc="trip from trip matrix - quality"/>
    <ExtRef serviceType="GOOSE" pLN="CSWI" pDO="OpOpn" pDA="general"
            intAddr="22222" desc="Open command"/>
    <ExtRef serviceType="GOOSE" pLN="CSWI" pDO="OpOpn" pDA="q"
            intAddr="22222" desc="Open command - quality"/>
    <ExtRef serviceType="GOOSE" pLN="CSWI" pDO="OpCls" pDA="general"
            intAddr="33333" desc="Open command"/>
    <ExtRef serviceType="GOOSE" pLN="CSWI" pDO="OpCls" pDA="q"
            intAddr="33333" desc="Open command - quality"/>
  </Inputs>
</LN>
```

In addition to the incoming signals from the CSWI additionally those from protection trips (instances of logical node class PTRC) and possibly any auto reclose function need to be given. The correct instances of the functions supplying these signals can again be found via the allocation of these LNs to the substation parts, in this case the same bay containing the XCBR instance. For XCBR phases, the substation description in SCL supports the definition of a sub-equipment per phase.

This Input/Extref template allows the device 30 to automatically bind trip signals from three different PTRC instances, and the open and close commands from one CSWI instance to the respective instance of XCBR.

Figure 5:
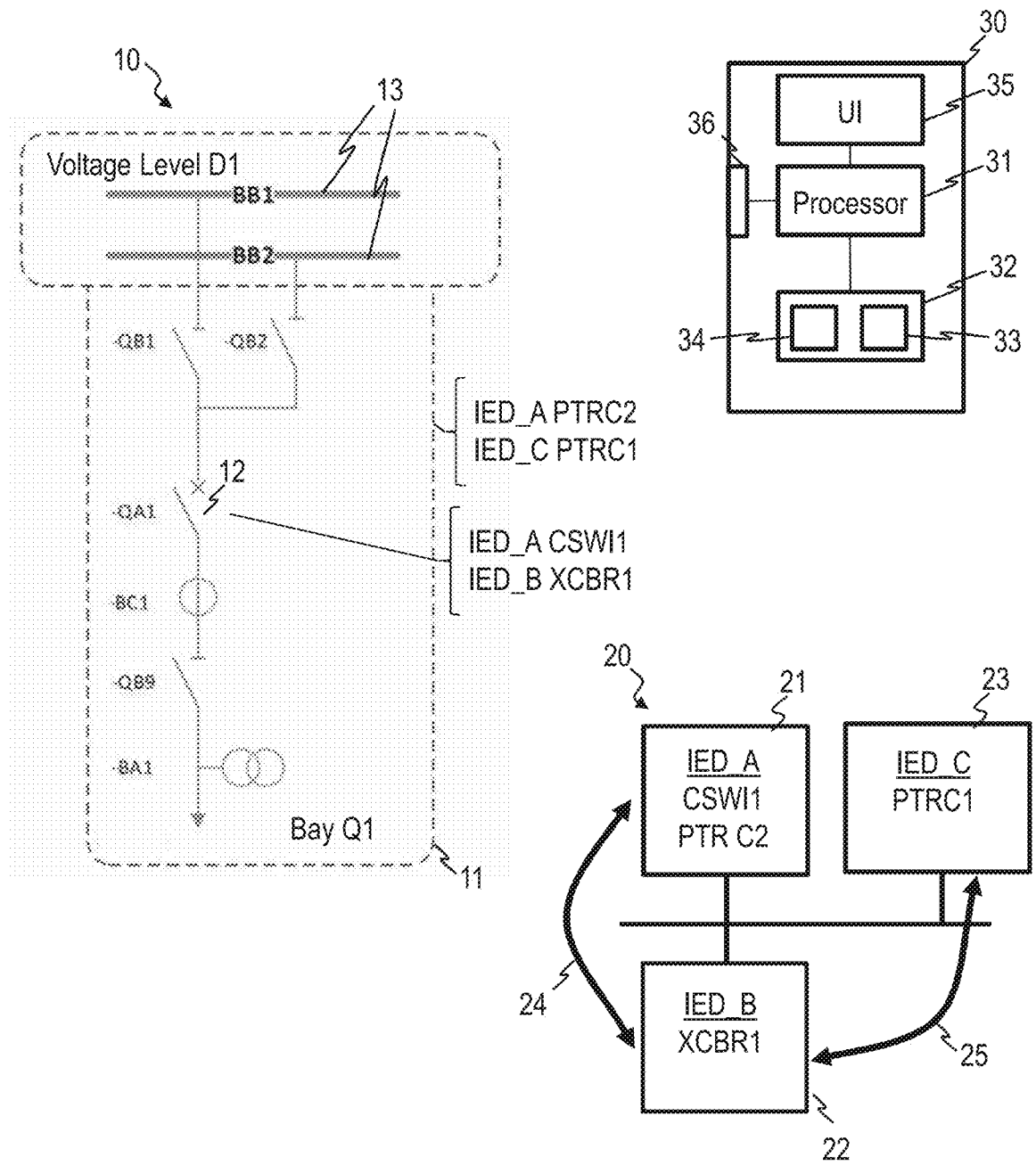
FIG. 5 is a schematic representation of an IACS and a computing device for configuring the IACS according to an embodiment.

The device 30 may use the formal substation description (e.g., an SCD file) to find the allocation of LN instances to the primary equipment. Referring to FIG. 5, Bay Q1 may be associated with voltage level D1 in a substation AA1. The logical node instance CSWI1 of logical node class CSWI may be hosted by a first IED (IED_A) 21. The logical node instance XCBR1 of logical node class XCBR may be hosted by a second IED (IED_B) 22. Both the logical node instance CSWI1 and the logical node instance XCBR1 may be associated with the same breaker 12. The logical node instance PTRC2 of logical node class PTRC may be hosted by the first IED (IED_A) 21. The logical node instance PTRC1 of logical node class PTRC may be hosted by the third IED (IED_C) 23. In an SCD file, the allocation of logical node instances to primary equipment could be represented as follows:

---
Substation: AA1
Voltage Level: D1
Bay: Q1
   LN PTRC1
   LN PTRC2
   PrimDev QA1
      LN CSWI1
      LN XCBR1
---

If the device 30 finds the XCBR instance XCBR1 with the above input data template in PrimDev AA1D1Q1QA1, the device 30 determines that the CSWI allocated to the same circuit breaker (CSWI1) shall send its OpOpn.general and OpCls.general signals with related quality signal to this XCBR instance (XCBR1) per GOOSE, and any PTRC instance in the same bay AA1D1Q1 (PTRC1, PTRC2) shall send its Tr.general signal to this instance XCBR1. This allows the device 30 to automatically complement the Input/ExtRef part of the input data template of the XCBR with the information relating to the source IEDs, such as names of the signals at the source IEDs and/or names of the source LN instances.

The device 30 also determines that the XCBR shall send its Position signals (Pos) to the CSWI allocated to the same circuit breaker. This allows the device 30 to automatically complement the Input/ExtRef part of the input data template of the CSWI with the information relating to the source IEDs (such as names of the signals at the source IEDs and/or names of the source LN instances).

The device 30 can configure appropriate data sets and GOOSE control blocks at the source IEDs that transmit the signals to the respective IEDs, and the Input/ExtRef can be complemented by the names of the signals at the senders, thus completing the binding process.

The thus completed SCL file can be imported into the device 30 for direct generation of the IED related configuration files. The IED related configuration files can be transferred to the IEDs.

Various effects and advantages are attained by the methods and devices according to the invention. The methods and devices assist an engineer in configuring IEDs. The internal binding, in which expected incoming signals of an IED are bound to the inputs of a logical node instance hosted by the IED that performs a function, can be performed fully or at least partially automatically. No private information on the algorithmic implementation of the function by the IED is required. The methods and devices use information on the general operation of the function, which represents application knowledge used by the device, and the kind of data required by the logical node instance to perform the function, which can be retrieved from the input data template, to perform automatic binding. By implementing the method and device of the invention at system tool level, a more streamlined engineering process is provided, as the same process interface can be used by several functions, e.g., control and protection. The final configuration file for the IEDs can directly be created from a SCD file and loaded onto the IEDs. As the methods and devices according to the invention operate based on information provided in a standardized way and do not need to know how the inside algorithm of the IED's function works, the methods and devices according to the invention can be used for configuring a wide variety of IEDs. The methods and devices according to embodiments allow the engineering time for a digital substation system to be reduced, despite a higher distribution of functions such as protection or synchrocheck.

Methods and devices according to the invention may be used in association with a power utility, e.g., for configuring IEDs of a SA system, but are not limited thereto. Embodiments of the invention may generally be used for configuring IEDs of an IACS.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method comprising:
   binding incoming signals of an intelligent electronic device (IED) with inputs of a function in accordance with an input data template to map the incoming signals to the inputs of the function, the function being performed by a logical node instance hosted by the IED in operation of an industrial automation control system (IACS);
   determining, based on the input data template, data required by the logical node instance to perform the function, the input data template being a template input section for late binding that is included in a configuration description;
   determining, using process related information of the IACS included in the configuration description, one or more source IEDs of the IACS and names of the signals at the source IEDs, the one or more source IEDs of the IACS provide the data required by the logical node instance to perform the function; and complementing configuration data of the IED by adding the names of the signals at the source IEDs to the template input section.

2. The method of claim 1, wherein the process related information is included in a process section which contains topology information and is part of a substation configuration language (SCL) file.

3. The method of claim 2, wherein determining source IEDs that provide the data comprises analysing the topology information to identify primary devices with which the source IEDs are associated.

4. The method of claim 1, wherein the process related information defines relations between logical node instances hosted by the source IEDs and primary devices.

5. The method of claim 1, wherein the configuration data is automatically complemented in response to at least one of the source IEDs and incoming signals being unambiguously identified.

6. The method of claim 1, further comprising outputting at least one of information on plural candidate source IEDs and information on plural candidate incoming signals via a user interface in response to determining that at least one of source IED and incoming signal cannot be unambiguously identified.

7. The method of claim 1, further comprising automatically creating data sets for communication between the IED and the one or more source IEDs.

8. The method of claim 1, wherein binding the incoming signals of the IED to the inputs of the function is successively performed for at least two different functions performed by the logical node instance of the IED.

9. The method of claim 1, wherein the function is selected from a group consisting of a control function, a synchro-check function, a breaker failure function, a differential protection function, a distance protection function, and an interlocking function.

10. The method of claim 1, wherein the IACS is a substation automation (SA) system.

11. The method of claim 1, wherein the input data template is an input data template of the logical node instance.

12. The method of claim 1, wherein the input data template is an input data template of the IED.

13. A device for configuring an intelligent electronic device (IED), wherein the device comprises:

a memory storage comprising instructions; and at least one processor in communication with the memory storage, wherein the at least one processor executes the instructions to:

bind, based on an input data template, incoming signals of the IED with inputs of a function to map the incoming signals to the inputs of the function, the function being performed by a logical node instance hosted by the IED in operation of an industrial automation control system (IACS);

determine, based on the input data template, data required by the logical node instance to perform the function, the input data template being a template input section for late binding that is included in a configuration description;

determine, using process related information of the IACS included in the configuration description, one or more source IEDs of the IACS and names of the signals at the source IEDs, the one or more source IEDs of the IACS used to provide the data required by the logical node instance to perform the function; and complement configuration data of the IED by adding the names of the signals at the source IEDs to the template input section.

14. The device of claim 13, wherein the input data template is an input data template of the logical node instance.

15. The device of claim 13, wherein the input data template is an input data template of the IED.

16. A storage medium storing computer instructions, that when executed by a processor, causes the processor to perform the steps of:

binding incoming signals of an intelligent electronic device (IED) with inputs of a function in accordance with an input data template to map the incoming signals to the inputs of the function, the function being performed by a logical node instance in operation of an industrial automation control system (IACS), and, based thereon:

determining, based on the input data template, data required by the logical node instance to perform the function, the input data template being a template input section for late binding that is included in a configuration description;

determining, using process related information of the IACS included in the configuration description, one or more source IEDs of the IACS and names of the signals at the source IEDs, the one or more source IEDs of the IACS providing the data required by the logical node instance to perform the function; and complementing configuration data of the IED by adding the names of the signals at the source IEDs to the template input section.

17. The storage medium of claim 16, wherein the process related information is included in a process section which contains topology information and is part of a substation configuration language (SCL) file.

18. The storage medium of claim 16, wherein binding the incoming signals further comprises binding the incoming signals in accordance with general process-related features of the function.

19. The storage medium of claim 16, wherein the input data template is an input data template of the logical node instance.

20. The storage medium of claim 16, wherein the input data template is an input data template of the IED.

* * * * *